I. A. LAKE.
PNEUMATIC CUSHION.
APPLICATION FILED SEPT. 15, 1915.
1,207,772.
Patented Dec. 12, 1916.
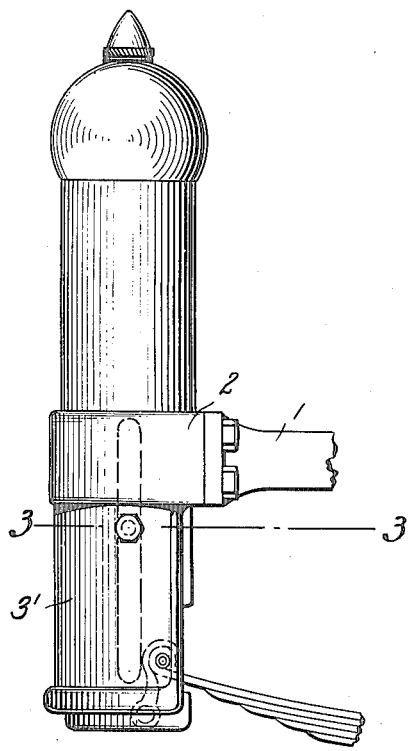
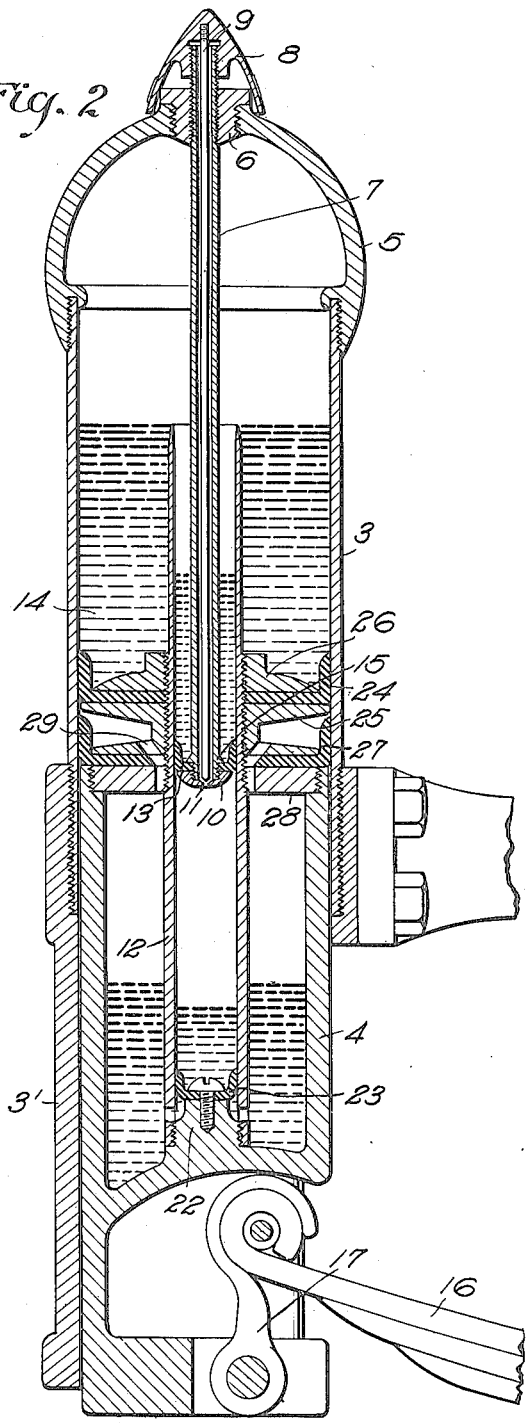
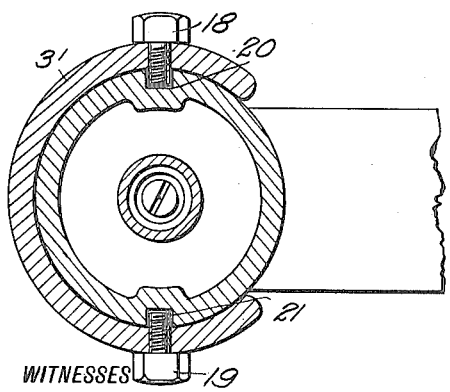
WITNESSES
INVENTOR
Irving A. Lake
BY Munn & Co
ATTORNEYS

UNITED STATES PATENT OFFICE.

IRVING A. LAKE, OF NEW YORK, N. Y., ASSIGNOR OF ONE-HALF TO EMILY LAKE, OF NEW YORK, N. Y.

PNEUMATIC CUSHION.

1,207,772.  Specification of Letters Patent.  Patented Dec. 12, 1916.

Application filed September 15, 1915. Serial No. 50,750.

*To all whom it may concern:*

Be it known that I, IRVING A. LAKE, a citizen of the United States, and a resident of the city of New York, borough of the Bronx, in the county of Bronx and State of New York, have invented a new and Improved Pneumatic Cushion, of which the following is a full, clear, and exact description.

This invention relates to pneumatic cushion devices for automobiles and other similar vehicles and has for an object the provision of an improved construction whereby air is confined in order to produce a cushioning effect.

Another object in view is to provide a cushion device in which a pump structure is provided for maintaining the supply of oil in the air chamber of the device.

A still further object in view is to provide a pair of telescoping members and a division member connected with one of the telescoping members, the same being normally positioned substantially midway between said telescoping members in order to divide the telescoping members into upper and lower chambers, the division member being associated with a pump device for pumping oil from the lower chamber to the upper chamber and thereby maintain the air pressure in the upper chamber while providing a proper lubricant at the proper place.

In the accompanying drawings:—Figure 1 is a side view of a pneumatic cushion embodying the invention; Fig. 2 is a longitudinal vertical section through the structure shown in Fig. 1, the same being on an enlarged scale; Fig. 3 is a section through Fig. 1 on line 3—3, the same being on an enlarged scale.

Referring to the accompanying drawings by numerals, 1 indicates a bracket adapted to be secured to an automobile or similar vehicle at any desired point and which is secured by bolts or screws to an annular enlargement 2 of a casing 3'. A pneumatic cushion, as shown in the drawing, is intended to absorb the shocks of an automobile by maintaining the body of the automobile substantially in the same plane while allowing the wheels to move up and down over the irregularities of the roadbed. In order to accomplish this result a certain amount of compressed air is necessary for causing the parts to respond quickly when one or more of the wheels moves downwardly into a depression.

In order to maintain air under pressure and yet allow a proper telescoping movement of the chambers 3 and 4, a quantity of oil is provided in each of these chambers, as shown in Fig. 2, which supplies continually a proper amount of lubricant and which makes these chambers air tight. Chamber 3 has a head or cap 5 connected thereto at the upper end in any suitable manner, as for instance, by threads. Cap 5 is provided with a removable plug 6 which has a threaded bore extending therethrough. A pipe 7 acting on the order of a piston rod is mounted in the threaded aperture of plug 6 and also receives the air cap 8, which air cap has a rod 9 connected therewith, said rod extending through pipe 7 and engaging the valve seat 10 when in a closed position. It will be seen from Fig. 2 that the lower end of rod 9 is tapered so as to fit in the aperture 11 of valve seat 10.

When it is desired to supply air to the device the air cap 8 is removed, together with rod 9. A pump is connected to pipe 7 and air is forced into the lower part of the tubular member 12 below the washer 13. As washer 13 faces upwardly the air will pass the washer and enter into chamber 3. The air cannot move backwardly or in a reverse direction as washer 13 would positively prevent such action, the same being assisted by the oil 14 arranged in the upper part of tubular member 12. After the proper pressure of air is provided in the chamber 3, rod 9 and cap 8 are applied and cap 8 together with rod 9 is rotated until the tapering end of rod 9 tightly fits into aperture 11.

Pipe 7 is provided with an enlargement 15 which acts as an abutment against which the threaded valve seat 10 forces washer 13, valve seat 10 acting as a nut in addition to a valve seat, and the whole construction of enlargement 15, seat 10 and washer 13 acting somewhat as a piston so that when the tubular member 12 is moved upwardly and then downwardly this piston structure, together with the pipe 7, will act as a pump for pumping oil from chamber 4 into chamber 3. Chamber 3 is threaded on to the enlargement 2 of casing 3' so that the same is supported by bracket 1, while chamber 4 is connected to spring 16 by a suitable hanger 17, as shown in Fig. 2, whereby as the wheels move up and down the chamber 4 will also move up and down in order to utilize the compressed air in chamber 3.

Chamber 4 slidingly fits into the chamber 3 and is allowed a free up and down movement therein but is positively prevented from accidental movement by means of the pins 18 and 19 (Fig. 3) which extend through part of the casing 3' and into grooves 20 and 21 formed in the walls of chamber 4. When it is desired to take the device apart the pins 18 and 19 must be removed. As shown in Fig. 2, the bottom of chamber 4 is provided with an upstanding threaded lug 22 on which is threaded the tubular member 12, while a washer 23 is secured in place by a suitable screw on the upper face of the lug, said washer facing upwardly, so as to allow oil to enter into the tubular member 12 from chamber 4 but to prevent any of the oil from tubular member 12 entering chamber 4. As chamber 4 and tubular member 12 move up and down the washer 13 and associated parts act as a pump and will gradually pump the oil from the lower part of the device to the upper part. During the movement of the device there will naturally be a slight leakage of oil past washer 24, which washer is held in place by the upper part of the division member 25 and by a clamping washer 26, washer 24 facing upwardly. The lower part of the division plate 25 engages the washer 27 and holds the same pressed tightly against a plate 28 threaded on to the upper end of chamber 4. A plurality of passageways 29 are provided in the lower part of the division plate 25, washer 27 and plate 28, as shown in Fig. 2, so as to allow any oil escaping past washer 24 to freely pass into chamber 4. The seepage of oil past washer 24 will provide ample lubrication for the washer and insure an air-tight joint without the loss of the oil, as the same is discharged into chamber 4 and from thence is pumped back into chamber 3.

In operation, when the device is in use and one or more wheels of the vehicle move downwardly into a depression, casing 3' and parts connected therewith, including washers 24 and 27, will move downwardly and the compressed air in the upper part of chamber 3 will expand so as to maintain a support for the body of the vehicle, this support being, of course, weakened by the expansion of the compressed air. Where no compressed air and no springs are used the downward movement of the wheels of a vehicle removes entirely the support of the body so that the body of the vehicle will move downwardly with the wheel and will consequently receive the jar. By the arrangement of the weakened support of the compressed air as just mentioned the wheel will be given time to rise from the depression before the body can move downwardly, whereupon the compressed air is again brought under the proper tension, thus causing the shock to have been absorbed or taken up by the air. This continued back and forth movement is utilized for causing the washer 13 and associated parts to act as a pump for maintaining the proper amount of oil in chamber 3 and consequently for maintaining the compressed air in chamber 3 in proper condition.

What I claim is:—

1. In a device of the character described, a pair of telescoping tubular members, the upper tubular member being closed at the upper end and the lower tubular member being closed at the lower end, a division member connected with the lower tubular member at the upper end, a tube connected to said lower tubular member at the lower end of said lower tubular member and extending to near the upper end of the other tubular member through said division member, a pipe extending through the top of said upper tubular member downwardly into said tube, an upwardly facing washer arranged at the bottom of said pipe and engaging said tube whereby the same will act as a pump, said pipe acting as an inlet guide for compressed air when the same is forced into said tube through said pipe and the upper telescoping tubular member.

2. In a device of the character described, a pair of telescoping members, a tube connected with the lower telescoping member, said tube having an opening adjacent the lower part communicating with the lower telescoping member, said tube extending to near the top of the upper telescoping member, a washer arranged above said opening, a member connected with the top of the upper telescoping member projecting into said tube, an upwardly facing washer connected with said member whereby when said telescoping members move said washer and associated parts act as a pump, a division member comprising a plate connected with the upper end of the lower telescoping member, said plate having openings adjacent said tube, a spool threaded on said tube, an upwardly facing washer surrounding said tube and resting on said end plate, said spool clamping said washer in position against said end plate, said spool having an opening therethrough registering with the opening in said end plate, an upwardly facing washer arranged on the upper end of said spool, and a nut threaded on to said tube for clamping said last mentioned washer in position.

3. In a device of the character described, a pair of telescoping tubular members, a casing connected to the upper tubular member, a pair of pins extending through said casing, said lower tubular member being provided with grooves extending longitudinally thereof for substantially the full length thereof, said pins extending into said grooves whereby the lower tubular member cannot rotate independent of the upper tubular member, means for connecting said casing to the body of the vehicle, means for connecting the lower tubular member to the spring of the vehicle, means for directing air into the upper tubular member, and a division plate connected to the lower tubular member fitting in the upper tubular member whereby the air in said upper tubular member will act as a cushion.

In testimony whereof I have signed my name to this specification in the presence of two witnesses.

IRVING A. LAKE.

Witnesses:
   A. L. KITCHIN,
   G. H. EMSLIE.